Aug. 5, 1952

C. E. BARKALOW 2,605,641

STARTING ARRANGEMENT FOR GYROSCOPIC
REFERENCE INSTRUMENTS

Filed April 1, 1949

2 SHEETS—SHEET 2

INVENTOR
CLARE E. BARKALOW
BY Arthur H. Serrell
his ATTORNEY

Patented Aug. 5, 1952

2,605,641

UNITED STATES PATENT OFFICE 2,605,641

STARTING ARRANGEMENT FOR GYROSCOPIC REFERENCE INSTRUMENTS

Clare E. Barkalow, Huntington, N. Y., assignor to The Sperry Corporation, a corporation of Delaware Application April 1, 1949, Serial No. 84,888

15 Claims. (Cl. 74—5.7)

This invention relates to starting arrangements for gyroscopic reference instruments by which the rotor is quickly brought up to normal operating speed and the rotor frame is quickly set to an approximately correct position. Heretofore, the initial preconditioning period required for an instrument of this character before the same functioned properly was relatively long. This was necessitated by the fact that with the rotor starting from a standstill condition, it took considerable time to get it up to speed. Also, where the precession controls for the rotor frame were slow and the rotor frame was considerably displaced from its proper position, it took a relatively long time for these controls to precess the rotor frame to its correct position. In gyro compasses, for instance, a preconditioning period of four hours for the instrument is recommended in order to insure that the sensitive element of the instrument has settled on the meridian, the rotor is at normal operating speed and the parts of the device are operating at normal running temperature conditions.

An object of the present invention is to shorten the starting period of a gyroscopic reference instrument so that the same will be properly conditioned for its intended use within a few minutes. This feature is particularly desirable where the gyroscopic device is used as a visual or controlling flight instrument on a high speed aircraft.

One of the features of the present invention is in the provision of means for supplementing the normal operating means for spinning the gyro rotor of the instrument when the rotor is started from a standstill condition together with a means for disabling the supplementing means as the rotor reaches its normal speed of operation.

A further feature of the invention resides in the arrangement provided for the quick setting of the frame of the instrument under starting conditions.

Figure 1:
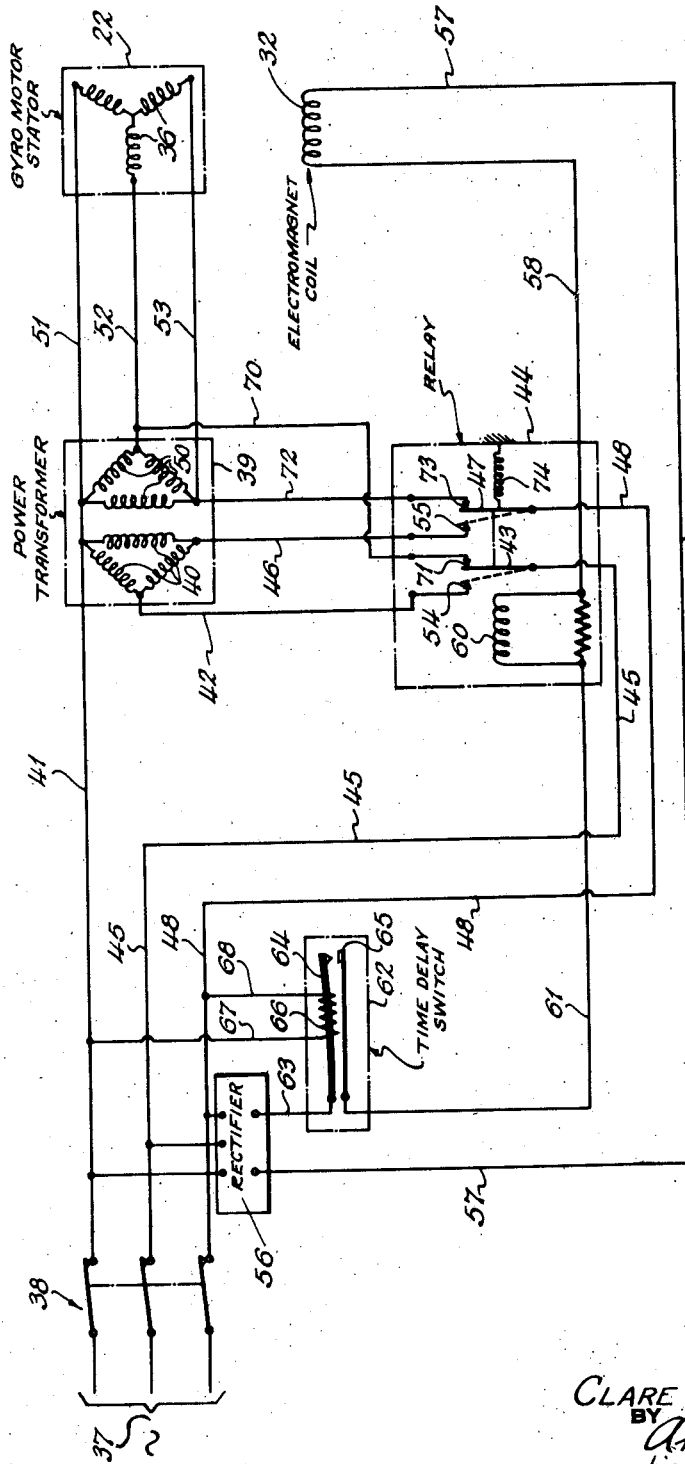
Figure 2:
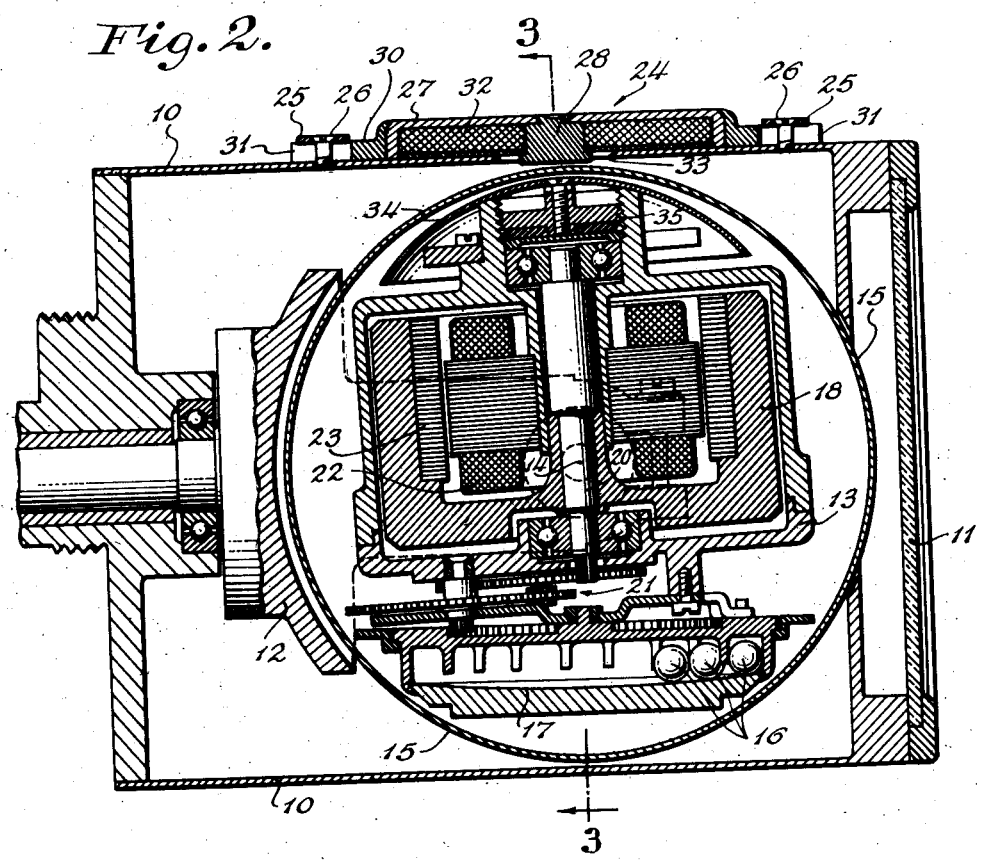
Figure 3:
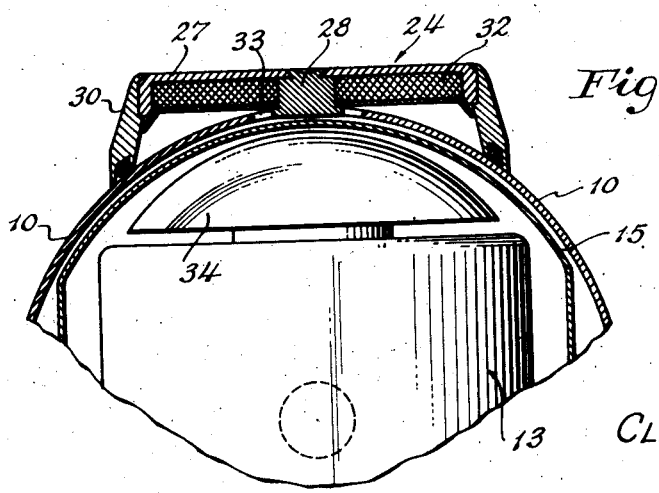

Other objects, features and structural details of the invention will be apparent from the following description when read in relation to the accompanying drawings, wherein:

Fig. 1 is schematic view and wiring diagram showing the relation and connection of the elements constituting the starting arrangement provided for the improved gyroscopic instrument, Fig. 2 is a vertical section of a gyroscopic instrument in which the present inventive concepts are embodied, and Fig. 3 is a sectional view taken in lines 3—3, Fig. 2, showing the upper portion of the gyroscopic instrument.

For purpose of illustration, the present invention is shown adapted for use in a gyroscopic reference instrument such as an indicating gyro vertical of the type shown and described in my copending application, S. N. 670,263, filed May 16, 1946. With reference to Fig. 2 of the drawing, the gyroscopic instrument shown therein includes a casing 10 or housing having a window 11 in the rear wall of the same. The front wall of the casing provides a pivotal mounting for a U-shaped gimbal ring 12 which supports a rotor frame 13 with freedom about an axis perpendicular to the axis of the ring designated at 14. In this type of instrument, it will be understood that the rotor frame 13 is universally mounted in the casing 10 with its mutually perpendicular axes of freedom normally horizontal. The instrument is also mounted in the craft whose pitch and roll attitude it indicates with the fore and aft axis of the craft parallel to the axis of gimbal ring 12 and with the front and rear walls of the casing oriented as designated. In the instrument shown, the pilot of the craft observes its attitude at the window 11 by comparing the markings (not shown) on the face of a spherical shell 15 fixed to the frame 13 relative to pitch and roll indices (not shown) at the window.

As shown in Fig. 2, the gyroscopic instrument includes an erecting device of the type which exerts a torque substantially at right angles to tilt to cause erection at a slow rate without spiralling. The erector shown is of the character described and claimed in the hereinbefore noted copending application. Such device includes a plurality of movable balls 16 situated in a rotatable container 17 located at the bottom of the frame 13. The container 17 is driven by the gyroscopic rotor 18 in the frame 13, the shaft 20 of the rotor being connected thereto by way of suitable reduction gearing designated at 21. The rotor 18 of the instrument is shown as spinning about an axis that is forwardly inclined 2½ degrees to the vertical. Motive means are provided to spin the gyroscopic rotor 18. Such means, as shown, may take the form of an alternating current induction motor of the squirrel cage type whose wound stator 22 is fixed to the frame 13. The cage type rotor, of the electric driving motor, indicated at 23 is included as a part of the gyroscopic rotor 18.

In accordance with the invention, a device is provided for setting the frame 13 quickly upon starting of the instrument so that the spin axis of the rotor 18 is situated in its normal approximately vertical position. This is particularly required where the erecting device for the instrument operates at slow erecting rates. As shown in Figs. 2 and 3, this device includes an electromagnet indicated at 24 that is fixedly mounted exteriorly of the casing 10 by means of an adjustable connection such as plates 25 and screw fastenings 26. The magnetically permeable elements of the electromagnet are formed of a cup-shaped member 27 and a central polepiece 28 connected thereto. The parts, as shown are mounted in a base member 30 that is a poor magnetic field conductor shaped to fit the exterior of the casing 10. Slots 31 are provided in opposite ends of the base member so that a small adjustment of the position of the electromagnet on the casing 10 can be made to accommodate the same for use on craft of different types. Plates 25 extend across the slots 31 and engage the extending arms of the base member 30. The annular end of the cup-shaped member 27 adjacent to the casing 10 provides the other polepiece of the electromagnet. The coil of the electromagnet is indicated at 32. In the construction shown, an opening 33 is provided in the casing 10 and the polepiece 28 of the electromagnet is situated at the opening to extend through the same in close proximity to an armature 34. The armature 34 is formed in the shape of a segment of a sphere that is fixedly connected to the top of the rotor frame 13 by a threaded connection 35. The curvature of the armature is such that the air gap between the same and the polepiece 28 diminishes in size as the frame 13 approaches a correct starting position in which it is illustrated in Fig. 2. The device operates to set the frame quickly relative to the casing 10 by exertion of direct torques about both axes of the frame. During the starting period the erecting torque of the normal erecting means 16, 17 of the instrument which preferably remains in operation, is greatly supplemented or over-shadowed by applicant's quick setting device.

In accordance with the present invention, the normal means for spinning the gyroscopic rotor is supplemented to bring the rotor up to speed quickly from a standstill condition. As herein shown, this action is accomplished by temporarily overenergizing the motive means provided to drive the rotor 18. A practical embodiment of such an arrangement is shown in Fig. 1, in which the windings of the motor stator 22 are indicated at 36. A source of alternating current electrical energy indicated at 37 is connected to the windings 36 when the starting switch 38 for the instrument is closed. This connection is made through a starting circuit that includes a step-up power transformer 39 which operates to bring the rotor 18 up to speed quickly. The primary windings 40 are connected to source 37 by way of lead 41; lead 42, the armature 43 in its dotted line position of a D. C. relay 44, lead 45; lead 46, the armature 47 in its dotted line position of relay 44 and lead 48. Leads 41, 45 and 48 are energized directly from the alternating current source 37. The secondary windings 50 of the transformer 39 are directly connected to windings 36 by way of leads 51, 52 and 53. A second starting circuit conditions or energizes the relay 44 when the switch 38 is closed so that armatures 43 and 47 are pulled against contacts 54 and 55 to close the circuit from the source 37 to the motor windings 36 through the transformer.

The second starting circuit includes the coil 32 of the electromagnet 24, the same being energized from source 37 by way of a 3 phase rectifier of a suitable character indicated at 56. This circuit includes lead 57, coil 32, lead 58, the coil 60 of relay 44, lead 61, a time delay switch 62 and lead 63. Under starting conditions, the bimetallic thermal element 64 of the switch 62 is cool and is in the closed position, making connection with contact 65 of the switch. The heating element for switch 62 may be provided by a resistor 66 connected to leads 41 and 48 respectively by leads 67 and 68. A circuit bypassing the transformer 39 is rendered effective after the starting circuits of the arrangement are opened by the switch 62 after a predetermined desired time interval such as required to bring the particular rotor of the instrument up to normal operating speed. The bypassing circuit connecting source 37 and windings 36 includes lead 70 connected to lead 52 and contact 71 of relay 44 together with lead 72 and contact 73 of relay 44. The spring 74 normally maintains the armatures 43 and 47 of relay 44 against the respective contacts 71 and 73.

In operation of the arrangement from a starting condition of the instrument with the rotor 18 stationary and the frame 13 with its spin axis tilted from its normal operating position, the starting switch 38 for the instrument is first closed. This simultaneously energizes the coil 32 of the quick setting device, energizes coil 60 of relay 44 so that energy from source 37 is supplied the windings 36 of the spinning motor by way of power transformer 39. In the starting condition, armatures 43 and 47 are pulled against the action of spring 74 to connect the same with contacts 54, 55. At the same time, the resistor 66 connected across the leads 41, 48 starts to heat the bimetallic element 64 of switch 62. At a predetermined time interval governed by the switch 62, the connection to contact 65 of the switch is broken and the circuit with coil 32 and relay coil 60 is opened. This deenergizes the winding 32 of electromagnet 24 and winding 60 of relay 44 permitting armatures 43, 47 to connect with contacts 71, 73 under the influence of spring 74. The instrument is thusly conditioned for normal operation with windings 36 energized from source 37 directly, with the frame controlled by its erecting device and with the quick setting device rendered ineffective.

Applicant has found that by the special cooperation found to exist between his quick setting or erecting device and his quick rotor accelerating means, a much shorter preconditioning period for gyro verticals is secured than by the use of either of these improvements alone. If, for instance, applicant's quick erecting means 32, 35 were used while the gyro was spinning at a constant speed, and initially inclined, it would merely produce spiralling of the gyro about the vertical position, so that the final settling on the vertical would still be dependent largely upon the normal erection device 16, 17. On the other hand, rapid acceleration of the rotor of a gyro vertical which is initially inclined causes the spin axis of a gyro vertical to rapidly assume a position perpendicular to the major gimbal axis. Thus in an airplane instrument in which the major gimbal is usually placed fore and aft, if the gyro were inclined in pitch about its minor gimbal axis, a strong erecting torque would be exerted by the reaction of the rotor accelerating means to quickly bring the spin axis into a perpendicular relationship to the major trunnion axis.

However, in case of an initial inclination about the roll axis, little or no erection torque due to acceleration of the rotor will be exerted. Under these conditions, however, applicant's direct acting quick erecting coil 32 causes the roll inclination to quickly become a pitch inclination, thus bringing into action the quick erection forces due to rotor acceleration. Applicant's combination, therefore, not only quickly brings the rotor up to speed but also secures a very quick erection, far quicker than could be secured by either or both of applicant's normal and quick erecting means acting alone or together and far quicker than applicant's rapid accelerator for the rotor acting alone or with only a normal erecting means.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyroscopic instrument, a gyroscopic rotor, an A. C. induction motor of the squirrel cage type operable to spin said rotor having a wound stator, a source of A. C. energy, a step-up transformer in the connection between the source and motor stator operable to bring said rotor quickly up to speed from a standstill condition, and means for bypassing said transformer after the starting up period including a relay and a time delay switch.

2. In a gyroscopic instrument, a gyroscopic rotor, electric motive means for spinning said rotor, a source of electrical energy, a first circuit normally connecting said source and motive means, a second circuit connecting the source and motive means including a power transformer, a relay energized to open the first circuit when the rotor is started from a standstill condition and a switch in the relay circuit to deenergize said relay and thereby open said second circuit after a predetermined time interval.

3. In a gyroscopic instrument, a gyroscopic rotor, an A. C. induction motor of the squirrel cage type operable to spin said rotor having a wound stator, a source of A. C. energy, a first circuit normally connecting said source and motor stator, a second circuit connecting said source and motor stator including a power transformer, a relay energized to open the first circuit when the rotor is started from a standstill condition, and a time delay switch in the relay circuit operable to deenergize said relay and thereby open said second circuit.

4. A gyroscopic instrument comprising a casing, a rotor frame universally mounted in said casing, a gyroscopic rotor in said frame, an electric motor operable to spin said rotor, a device for setting the frame quickly upon starting of the instrument operable to exert a torque about the axes of the frame including an electromagnet fixed to the casing and an armature fixed to the frame, a source of electrical energy, a starting circuit connecting the source and motor including a power transformer operable to bring the rotor up to normal operating speed quickly, a second starting circuit connecting said source and electromagnet including a switch for opening the circuit after a predetermined time interval and a relay, and a third circuit bypassing said transformer connecting said source and motor rendered effective by said relay when said second circuit is opened.

5. An instrument as claimed in claim 4, in which the casing has an opening therein, and the electromagnet is mounted exteriorly of the casing with one of its pole pieces at the opening in the casing.

6. In a gyroscopic instrument, the combination of, a universally mounted rotor frame, a gyroscopic rotor, an electric motor operable to spin said rotor, a device for setting the frame quickly upon starting of the instrument operable to exert a torque about the axes of the frame including an electromagnet and an armature, a source of electrical energy, means for connecting said source and electromagnet when the instrument is started from a standstill condition, means for connecting said source and motor under such condition including a power booster for bringing the rotor up to normal operating speed quickly, and means operable to deenergize said electromagnet and deactivate said booster after the lapse of a predetermined time interval.

7. In a gyro vertical, a casing, a rotor frame universally mounted in said casing, a device for setting the frame quickly upon starting of the instrument operable to exert a torque about the axes of the frame including an electromagnet and an armature, one fixed to the frame and the other to the casing, a source of electrical energy, and a starting circuit connecting the source and electromagnet including a switch for opening the circuit after a predetermined time interval.

8. A gyro vertical as claimed in claim 7, in which the normal position of the rotor spin axis is slightly inclined to the vertical and said electromagnet is adjustably mounted on said casing whereby the initial angle of inclination may be adjusted.

9. In an electric gyroscopic instrument for aircraft, electrical means for spinning the rotor at a desired speed, means for normally erecting the gyroscope at a desired rate, auxiliary means for causing an increased spinning torque to be exerted on the rotor when starting up the gyroscope, auxiliary means for simultaneously erecting the gyroscope at an accelerated rate, and a time delay switch in the auxiliary circuits for said gyroscope having means for rendering inoperative the auxiliary spinning means and auxiliary erecting means a predetermined interval after starting.

10. In a gyroscopic instrument, a gyroscopic rotor, electric motive means for spinning said rotor, means for over-energizing said motive means to bring said rotor quickly up to speed from a standstill condition, normal and auxiliary means for erecting the rotor, and a device for disabling said overenergizing means and said auxiliary erecting means after the lapse of a predetermined time interval.

11. In a gyroscopic instrument, a gyroscopic rotor, normally energized motive means for spinning said rotor, means for over-energizing said motive means to bring said rotor quickly up to speed from a standstill condition, normal and auxiliary means for erecting the rotor, and a device for disabling said over-energizing means and said auxiliary erecting means after the lapse of a predetermined time interval after starting.

12. A quick starting arrangement for gyro verticals having a universal gimbal mounting, a normal power erector and a normal means for spinning the rotor; an auxiliary means for exerting torques directly opposing tilt of the gyro, and auxiliary means for rapidly accelerating the rotor, both said auxiliary means being activated for a limited period only on starting the gyroscope.

13. A quick starting arrangement for gyro verticals having a universal gimbal mounting, a normal power erector and a normal means for spinning the rotor; an auxiliary means for exerting torques directly opposing tilt of the gyro, auxiliary means for rapidly accelerating the rotor, both said auxiliary means being activated on starting the gyroscope, and time delay means for throwing out both said auxiliary means.

14. In a gyro vertical having a rotor frame, a rotor, rotor spinning means, normal erecting means, abnormal or a normally ineffective torquing device for setting the frame quickly under starting conditions, means operable to start the gyro vertical from a standstill condition, and means responsive to said starting means for rendering said quick setting device effective, for operating said erecting means, and for boosting said rotor spinning means to rapidly accelerate said rotor, thereby providing a third erecting torque in addition to lessening the spin up period for the rotor.

15. In a gyroscopic instrument for mobile craft having a gyroscopic rotor, an electric motor for spinning said rotor and a source of power for said motor, a normally idle transformer for temporarily boosting the voltage supplied by said source to said motor, a starting relay for connecting said power source to said motor either directly or through said transformer when energized for energizing said relay to connect said motor to said transformer upon starting up, and time delay means for opening said switch to deenergize said relay and disconnect said transformer after a predetermined interval.

CLARE E. BARKALOW.

REFERENCES CITED

The following references are of record in the file of this patent:

UNITED STATES PATENTS

| Number | Name | Date |
| --- | --- | --- |
| 1,145,025 | Leavitt | July 6, 1915 |
| 1,192,468 | Shonnard | July 25, 1916 |
| 1,559,110 | Liddick | Oct. 27, 1925 |
| 2,181,250 | Reichel | Nov. 28, 1939 |
| 2,211,985 | Peters | Aug. 20, 1940 |
| 2,238,645 | Horn | Apr. 15, 1941 |

FOREIGN PATENTS

| Number | Country | Date |
| --- | --- | --- |
| 291,047 | Great Britain | Mar. 19, 1928 |
| 591,598 | Great Britain | Aug. 22, 1947 |
| 473,048 | France | Sept. 5, 1914 |